(No Model.)
L. F. GAUDÉ, Dec'd.
E. GAUDÉ, Administratrix.
APPARATUS FOR BLEACHING CANE JUICE.
No. 511,608. Patented Dec. 26, 1893.
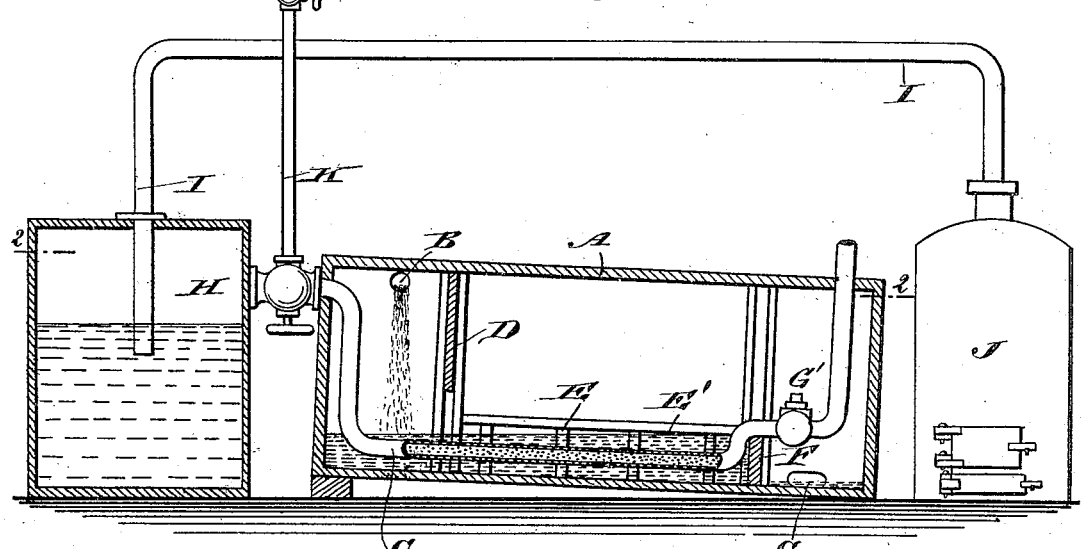
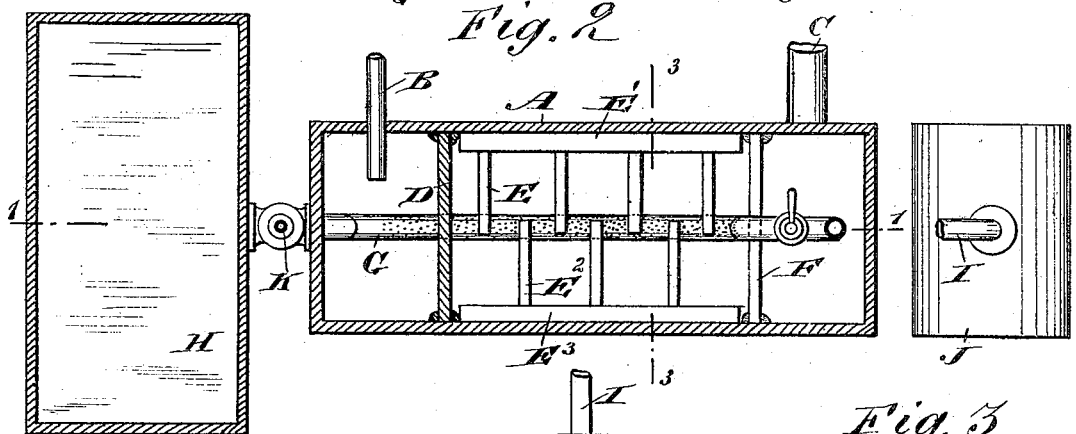
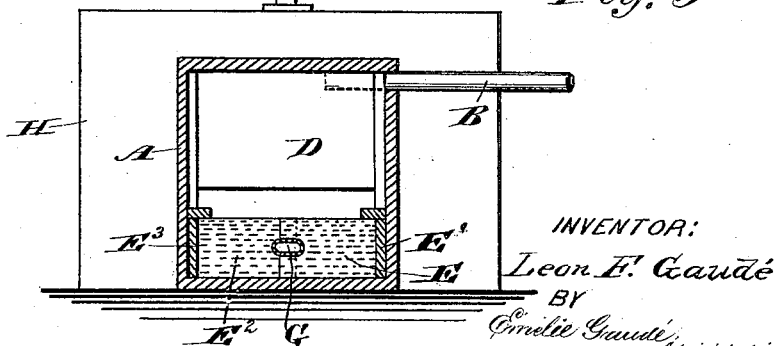

UNITED STATES PATENT OFFICE.

EMELIE GAUDÉ, OF THIBODEAUX, LOUISIANA, ADMINISTRATRIX OF THE ESTATE OF LEON F. GAUDÉ, DECEASED.

APPARATUS FOR BLEACHING CANE-JUICE.

SPECIFICATION forming part of Letters Patent No. 511,608, dated December 26, 1893.

Application filed August 18, 1892. Serial No. 443,396. (No model.)

*To all whom it may concern:*

Be it known that I, EMELIE GAUDÉ, of Thibodeaux, in the parish of La Fourche and State of Louisiana, administratrix of the estate of LEON F. GAUDÉ, deceased, who did in his lifetime invent a new and Improved Bleaching Apparatus for Sugar-Cane Juice, do declare the following to be a full, clear, and exact description of the same.

The object of the invention is to provide a new and improved apparatus for bleaching sugar cane juice in a very simple, inexpensive and effective manner.

The invention consists principally of a closed box connected at one end with a juice supply and provided at its other end with an outlet for the bleached juice, and a perforated pipe passing through the said box and immersed in the cane juice, the said pipe being connected with a sulphur supply and a steam pipe.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement on the line 1—1 of Fig. 2. Fig. 2 is a sectional plan view of the same on the line 2—2 of Fig. 1; and Fig. 3 is a transverse section of the same on the line 3—3 of Fig. 2.

The improved bleaching apparatus is provided with a box A, made of suitable material and of dimensions according to the amount of juice to be treated. The box A is provided near one end near the top with a cane juice inlet pipe B, connected with a suitable source of supply to discharge the cane juice into the upper end of the box A, the latter being slightly set in an inclined position as illustrated in Fig. 1. In the lower end of the box and near the bottom of the same is an outlet pipe C, for carrying off the bleached juice. Within the box A is arranged a transverse partition D, located at one side of the inlet pipe B and extending downwardly from the top of the box to within a suitable distance of the bottom, so that the juice entering the pipe B flows under the lower edge of the said partition D to come in contact with a series of transversely-extending partitions E, attached to a plate E' held in one side of the box A, the said partitions E resting on the bottom of the box A and extending about midway across the box as will be readily understood by reference to Fig. 2. A second series of partitions $E^2$, similar to the partitions E are fastened to a plate $E^3$, held on the other side of the box A, and the said partitions $E^2$ alternate with the partitions E, so as to cause the cane juice flowing under the partition D to flow from one side of the box to the other, being directed by the several alternating partitions E and $E^2$ until the juice finally flows over a transverse partition F, arranged in the lower end of the box A and extending upwardly from the bottom to about the same height as the partitions E and $E^2$.

A perforated pipe G, of suitable material extends longitudinally through the box A and is held in the inner ends of the partitions E and $E^2$, so as to extend a suitable distance above the bottom of the box or casing A, the said perforated pipe lying about midway of the height of the partitions E and $E^2$, and adapted to be closed at the end of the box by a suitable valve G'. Now, the cane juice flowing from one side to the other, being directed by the alternating partitions E and $E^2$ passes under and over the perforated pipe, so that the gases issuing through the perforations in the said pipe come in contact with the entire mass of cane juice flowing from the upper end of the box to the lower or discharge end thereof.

The pipe G is connected at the upper end of the box A with a gas-washing tank H, containing water into which discharges a supply pipe I, connected with a stove J, of any approved construction and serving to generate sulphur vapor which passes through the pipe I into the water in the tank H to be cleaned therein, to be finally discharged into the pipe G passing through the box or casing A. The inlet of the pipe G in the tank H is above the water, and into the said pipe G between the box A and the tank H discharges a steam pipe K, connected with a suitable source of steam supply. The steam injected into the pipe G draws the sulphur vapor from the tank H and mixes with the same, and forces the mixture through the perforated part of the pipe G into and through the cane juice flowing in the bottom of the box A in the manner above described, so that the sulphur vapors bleach the cane juice which is finally discharged through the pipe C in a bleached condition.

It will be seen that by this apparatus the bleaching agent is injected in a very simple and inexpensive manner into the flowing cane juice, so that all particles of the latter are acted on by the sulphur vapor, thus completely bleaching the entire mass of cane juice passing through the box or casing A.

What is claimed as new, and desired to be secured by Letters Patent, is—

1. A bleaching apparatus for sugar cane juice, comprising a box provided at one end with a juice supply and at its other end with an outlet for the bleached juice, a series of alternating transverse partitions for directing the flow of the juice from one side of the box to the other, a perforated pipe extending through the said box in the said partitions so as to be entirely surrounded by the flowing cane juice, one end of the said pipe being connected with a gas-washing tank to supply sulphur vapors, and a steam supply pipe discharging into the perforated pipe, substantially as shown and described.

2. A bleaching apparatus for sugar cane juice, comprising a box provided at one end with a juice supply and at its other end with an outlet for the bleached juice, a series of alternating transverse partitions for directing the flow of the juice from one side of the box to the other, a perforated pipe extending through the said box in the said partitions so as to be entirely surrounded by the flowing cane juice, a gas-washing tank to supply sulphur vapors connected with the said pipe, a vapor stove for generating sulphur vapor and connected with the said gas-washing tank, and a steam pipe discharging into the said perforated pipe adapted to draw the sulphur gases from the gas-washing tank and discharge the same through the perforations into the flowing juice, substantially as shown and described.

EMELIE GAUDÉ,
*Administratrix of the estate of Leon F. Gaudé, deceased.*

Witnesses:
L. JE. COULLOUET,
LOUIS CANTRELLE.